(12) United States Patent
O'Sullivan et al.

(10) Patent No.: US 8,027,452 B2
(45) Date of Patent: *Sep. 27, 2011

(54) METHOD FOR EXPLOITATION OF LOCATION PROXIMITY TO DERIVE A LOCATION OF EMPLOYEES UTILIZING INSTANT MESSAGING

(75) Inventors: Patrick O'Sullivan, Dublin (IE); Hema Srikanth, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 963 days.

This patent is subject to a terminal disclaimer.

(21) Appl. No.: 11/951,701

(22) Filed: Dec. 6, 2007

(65) Prior Publication Data

US 2009/0147933 A1 Jun. 11, 2009

(51) Int. Cl.
*H04M 3/42* (2006.01)
(52) U.S. Cl. .................... 379/218.02; 707/706; 707/713
(58) Field of Classification Search .... 455/456.1–456.3; 379/218.01–218.02; 707/706–708, 713
See application file for complete search history.

(56) References Cited

U.S. PATENT DOCUMENTS

| | | | | |
|---|---|---|---|---|
| 6,009,333 | A * | 12/1999 | Chaco | 455/456.5 |
| 7,808,378 | B2 * | 10/2010 | Hayden | 340/506 |
| 2007/0116226 | A1 | 5/2007 | Bennett et al. | |

OTHER PUBLICATIONS

Millen, et al, "Mind Maps and Causal Models: Using Graphical Representations of Field Research Data", CHI 97 Electronic Publications: Late-Breaking / Interactive Posters, 1997.
Erickson, et al., "Socially Translucent Systems: Social Proxies, Persistent Conversation, and the Design of Babble", IBM T.J. Watson Research Center, 1999.
Semantic Studios: "Social Net work Analysis", [Online: http://www.semanticstudios.com/publications/semantics/000006.php], Retrieved online Dec. 5, 2007.
Creo Six Degrees Software 1.51 [Online: http://www.tucows.com/preview/274464] Retrieved online Dec. 12, 2007.
Kharif, "Social Networking Goes Mobile" Business Week, May 31, 2006.

* cited by examiner

*Primary Examiner* — Simon Sing
(74) *Attorney, Agent, or Firm* — Cantor Colburn LLP; Raymond Szeto

(57) ABSTRACT

A method for exploitation of location proximity to derive a location of an employee in a corporation utilizing instant messaging or automatic telephone calls is provided. A search request for a location of an employee is received. A look up of coworkers of the employee in a corporate database is performed. A list of neighbors of the employee is extracted from the coworkers, and the list of neighbors of the employee is generated in accordance with the proximity of neighbors in the list of neighbors to a workspace of the employee. The list of neighbors is presented, in response to the search request. The list of neighbors is polled to locate the employee via instant messaging and/or automatic telephone calls. The location of the employee is received, in response to polling the list of neighbors. The neighbors are alerted that the employee has been located.

3 Claims, 3 Drawing Sheets

METHOD FOR EXPLOITATION OF LOCATION PROXIMITY TO DERIVE A LOCATION OF EMPLOYEES UTILIZING INSTANT MESSAGING

TRADEMARKS

IBM® is a registered trademark of International Business Machines Corporation, Armonk, N.Y., U.S.A. Other names used herein may be registered trademarks, trademarks or product names of International Business Machines Corporation or other companies.

TECHNICAL FIELD

This invention relates to techniques for locating individuals, and particularly to indirect location of individuals through a third party.

DESCRIPTION OF BACKGROUND

Instant messaging has been a prevalent way of communicating and collaborating with peers around the world. Often the challenge exists when an instant messaging (IM) partner is not available on an instant messaging system (such as Lotus Sametime®, AOL instant messenger (AIM), or Yahoo Messenger), or the person may not be available via telephone, cellular telephone, short message service (SMS), email, pager, etc. Situations often arise where employees may need to be contacted immediately, e.g. for a crisis, to inform him or her of an urgent family matter, to prompt an individual to attend a meeting that he or she has accepted but inadvertently neglected attend. If the participant cannot be reached via IM, phone, email, or SMS, inefficiency may result from time lost in either not completing the task at hand on time or rescheduling the meeting to a different time. This is especially the case if the absent person is a primary/mandatory attendee. Likewise, time is wasted by other participants who arrive on time for the meeting or eMeeting.

It would be beneficial to have techniques to prevent or resolve issues related to individuals who may be absent or missing from engagements.

SUMMARY

A method for exploitation of location proximity to derive a location of an employee in a corporation utilizing instant messaging or automatic telephone calls is provided in accordance with exemplary embodiments. A search request for a location of an employee is received. A look up of a plurality of coworkers of the employee in a corporate database is performed. A list of neighbors of the employee is extracted from the plurality of coworkers, and the list of neighbors of the employee is generated in accordance with the proximity of neighbors in the list of neighbors to a workspace of the employee. The list of neighbors is presented, in response to the search request. The list of neighbors is polled to locate the employee via instant messaging and/or automatic telephone calls. The location of the employee is received, in response to polling the list of neighbors. The neighbors are alerted that the employee has been located.

Additional features and advantages are realized through the techniques of the exemplary embodiments. Exemplary embodiments are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of the exemplary embodiments are apparent from the following detailed description taken in conjunction with the accompanying drawings in which:

The detailed description explains exemplary embodiments, together with advantages and features, by way of example with reference to the drawings.

DETAILED DESCRIPTION OF EXEMPLARY EMBODIMENTS

Exemplary embodiments provide techniques for indirect location of an individual through a third party. Often, having the knowledge of who sits nearby an individual is sufficient to locate the individual, where an intermediate can act as a proxy who can in turn alert the individual to an urgent action in accordance with exemplary embodiments. Exemplary embodiments build a system and provide a method to facilitate this knowledge. Furthermore, exemplary embodiments utilize this knowledge to exploit the social network metaphor as it applies to the individual.

Typically, individuals work in an office environment and at a desk. Usually, the desks are numbered and the numbering is sequential. The numbering is most likely done in an organized way. Also, each employee has a designation in terms of a desk number, telephone, office location, extension, etc. In general, this information may be housed in a database. For example, in many cases this information may reside in systems, applications, and products of a data processing system (e.g., in an employee record) or in a corporate directory. Also, this information may reside in an enterprise resource planning software such as SAP/Peoplesoft.

In accordance with an exemplary embodiment, a user may employ indirect location of an employee through a third party by performing a lookup on a corporate directory (e.g., LDAP) and extracting the desk number for this employee being searched (or extracting this from a SAP system by interrogating the employee's record). A search is then executed against the relevant database(s) for the nearest neighbors that satisfy certain parameters (e.g., being within a particular proximity of the employee being searched for). Once satisfied, a user interface may be presented that lists the names of the nearest neighbors, with real-time presence awareness that allows the user to instant message (IM) these neighbors. Also, in exemplary embodiments, an urgent request to contact an individual can target (via broadcast) all of the individual's nearest neighbors. Accompanying the broadcast is some knowledge (which may be user configurable) that describes the reason the neighbors are being asked to help locate this individual (employee). The broadcast may be configured to allow the recipient (e.g., the nearest neighbors) to know that others have also been polled, or indeed configured to simulate a 1:1 request. Further, in exemplary embodiments, a multi-party IM may be broadcast based on location proximity that gets answered with the desired outcome (e.g., one person locates and contacts the employee in question), and the multi-party IM provides the ability for a response from the successful neighbor to be propagated to all neighbors polled, thereby eliminating the need for others to continue helping.

Figure 1:
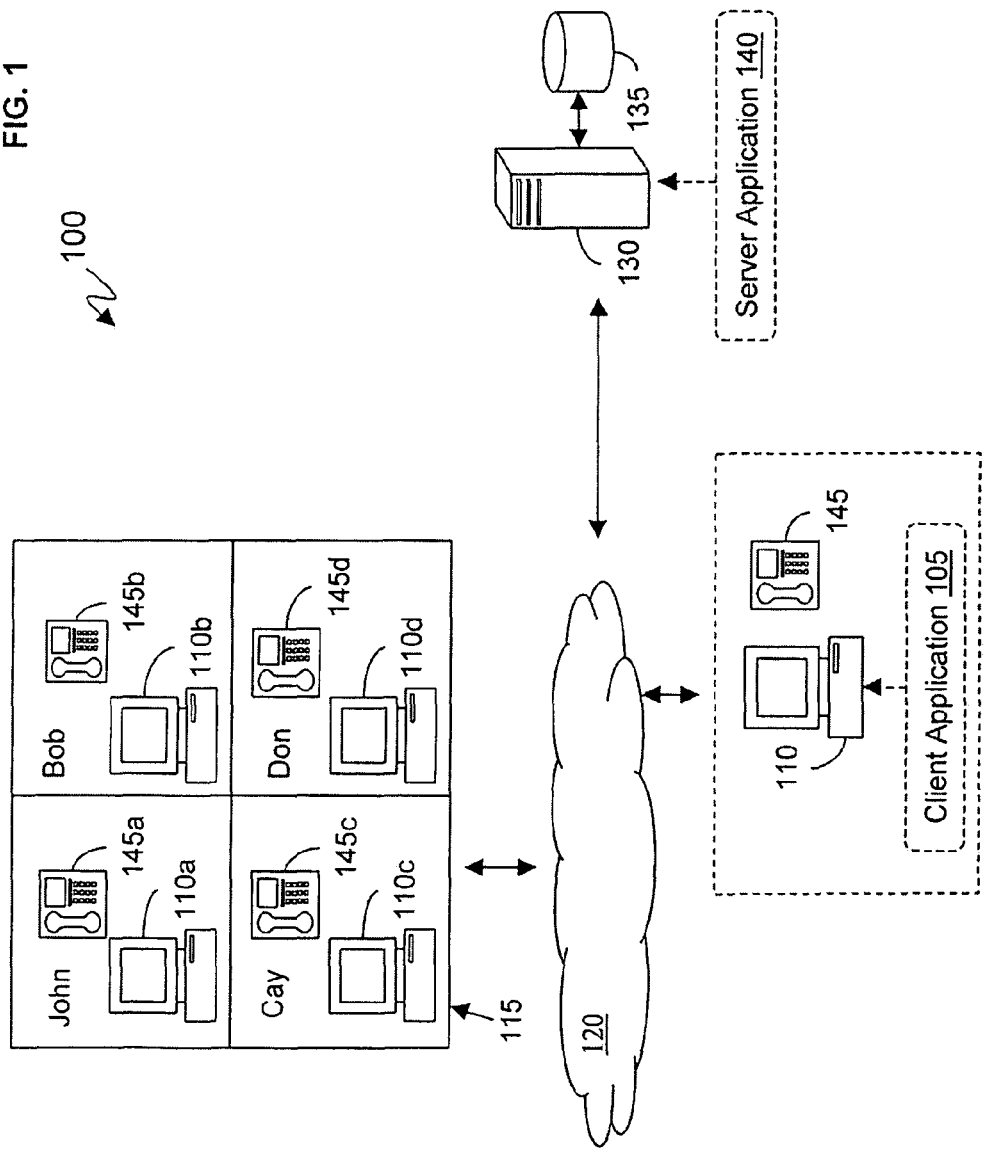
FIG. 1 illustrates a system for exploiting location proximity to derive a desired response utilizing, e.g., instant messaging (IM) and/or telephone calls in accordance with exemplary embodiments.

FIG. 1 illustrates a system 100 for exploiting location proximity to derive a desired response utilizing, e.g., instant messaging (IM) in accordance with exemplary embodiments. As a non-limiting example, a person utilizing a client application 105 residing on a communication device 110 may be looking for John. John's office may be located within or near a plurality of workspaces 115, and the workspaces 115 are within some proximity to the workspace of John. Each of the workspaces 115 includes a device for communicating (that may be the same or similar to the communication device 110) which is designated for clarity as a communication device 110a, communication device 110b, communication device 110c, and communication device 110d. The communication device 110a represents the device used by John in the John's office. The other communication devices 110b, 110c, 110d are used, e.g., by coworkers of John who are neighboring John in their respective workspaces 115, and the coworkers who neighbor John may be Bob, Cay, and Don, respectively. The communication devices 110a, 110b, 110 c, 110d each contain the client application 105.

The communication devices 110, 110a, 110b, 110c, 110d communicate with each other and with one or more servers 130 coupled to one or more storage devices 135 via one or more networks 120. A server application 140 resides on the server 130. The server application 140 and the client application 105 interact and share responsibilities for implementing operations in accordance with exemplary embodiments.

The network 120 may include circuit-switched and/or packet-switched technologies and devices, such as routers, switches, hubs, gateways, etc., for facilitating communications among the communication devices 110, 110a, 110b, 110c, 110d, and the server 130. The network 120 may include wireline and/or wireless components utilizing, e.g., IEEE 802.11 standards for providing over-the-air transmissions of communications. The network 120 can be an Internet protocol based network for communication thereon.

Also, the network 120 may include wireline and/or wireless components utilizing standards for, e.g., multimedia messaging services (MMS) such as instant messaging services. The network 120 may include a multimedia messaging center (MMC) which implements the network side of multimedia messaging service (MMS), and makes it possible for a network operator to offer multimedia (e.g., instant) messaging to the end users. The MMC is a highly flexible system, which can be adapted to the needs of the operator and the particular end users involved (such as users of the communication devices 110, 110a, 110b, 110c, 110d).

In accordance with exemplary embodiments, the network 120 can be representative of numerous networks. For example, the network 120 may include and/or access the Internet, and the network 120 may include an intranet that has restricted access for employees.

In accordance with exemplary embodiments, a person (e.g., a searcher) looking for an individual (e.g., John) can input a request, such as "show me nearest neighbors" of John, in the client application 105 of the communication device 110. Associated with this functionality of requesting "show me nearest neighbors" may be parameters in the client application 105 which allow the person to configure, e.g., the definition of the nearest neighbors to be "within N desks away." In the client application 105, additional parameters may include, e.g., "refine list to neighbors who are online", "refine list to neighbors who are part of her team", etc.

In exemplary embodiments, when a person (e.g., using the communication device 110) performs a search for an employee on the client application 105, the client application 105 may interact with (or causes) the server application 140 to perform a look up in the server 130 and/or the storage device 135, and the client application 105 (or server application 140) may extract, e.g., the desk number or extension for this employee (i.e., John) as a result of the look up. In exemplary embodiments, the employee's desk number may be used by the client application 105 (or server application 140) to extract neighbors of the employee. The neighbors may be within N desks (offices) away from the employee, on the same hall, etc. As a non-limiting example, this information may be extracted from a SAP system by interrogating an employee's record. As a non-limiting example, the look up may be performed on a corporate directory utilizing a lightweight directory access protocol (LDAP).

Using the client application 105, a search is executed against the relevant database (e.g., on the server 130 or storage device 135) for the nearest neighbors that satisfy the parameters discussed in exemplary embodiments. In response to the search for the nearest neighbors, a user interface of the client application 105 presents a list of names of the neighbors, with real time presence awareness that allows the user to LM these neighbors. As a non-limiting example, the client application 105 may indicate that the nearest neighbors are coworkers who utilize the communication devices 110b, 110c, 110d. As a non-limiting example, Bob may use the communication device 110b, Cay may use the communication device 110c, and Don may use the communication device 110d. The client application 105 has IM capabilities (or may interact with a client application having IM capabilities) and recognize tell if each of the neighbors Bob, Cay, and Don are present. In exemplary embodiments, a separate or different IM application may be used and the IM application can recognize which of John's neighbors are present. In exemplary embodiments, once the list of neighbors is generated, the client application 105 can automatically transmit IMs to each of the neighbors asking for help in locating John.

Although workspaces 115 illustrate four different offices (or cubicles), the illustration of workspaces 115 is not meant to be limiting in any way and is provided for explanatory purposes. It is understood that the proximity of John relative to his coworkers may be greater or smaller than depicted in FIG. 1. Also, it is understood that scenarios with John is provided as non-limiting examples in accordance with exemplary embodiments, and any individual can be searched for and located using the methods and systems discussed herein.

In exemplary embodiments, an urgent request to contact an individual (John) can target (via broadcast) all of the individual's nearest neighbors. Accompanying the broadcast is some knowledge (user configurable) that describes the reason they are being asked to help locate this individual. The broadcast can be configured to allow the recipient (e.g., the coworkers) to know that others have also been polled or configured to simulate a 1:1 request. The client application 105 (in conjunction with the server application 140) can be used to broadcast the urgent requests to the coworkers to locate the individual.

In exemplary embodiments, a response from the successful neighbor who locates the individual can be propagated to all neighbors polled, thereby eliminating the need for others to continue helping. As a non-limiting example, a multiparty IM broadcast may be transmitted from the person who locates and contacts the individual in question (i.e., John), so that other can stop looking.

Further, in accordance with exemplary embodiments, an individual's social network may be used to populate a list of neighbors under a category, e.g., "John's primary social network." John's primary social network is a list that is motivated by activity on John's side (e.g., emails sent and received by John, instant messages sent and received by John, web conferences (WCs), calendar events of John's) and allows a remote person to establish and access John's social network, which can then be exploited. As a non-limiting example, John's primary social network may include people that John personally interacts with outside of work. John's primary social network may include people from a social network such as MySpace or Facebook.

In exemplary embodiments, a look up on the social network may be performed to extract a collection of people who are closely associated/connected with the person being searched (i.e., John). In this exemplary embodiment, the person's social network is used to populate a list of neighbors under a category, e.g., "John's primary social network". Such a list is motivated by activity on the side of the person (John) being searched for (e.g., email, IM, WCs, calendar events) and allows a remote user to establish the person's social network, which can then be exploited. In exemplary embodiments, developing the social network may involve populating the social network via an integration with other applications like Facebook, Myspace, etc. The social network will be populated by identifying people, who are tightly connected with the person being searched, in other social networking applications (such as, Gmail, Myspace, etc.), and an automatic note will be sent to those people or a message will be posted in their space (e.g., Myspace) with this search request. Likewise, when a search request is answered, a follow on note is transmitted to the same social network to inform that the search is complete and to eliminate the need for others to continue helping.

Additionally, in exemplary embodiments, individuals (such as John) are able to specify an acquaintance list, which is a user defined preference associated with John's instant messaging client (e.g., the client application 105). The acquaintance list may reside on the server 130 and/or storage device 135. The user defined acquaintance list may be set to override the other three types of categories defined above, such as LDAP, proximity, or social network. Once the acquaintance list or any other list is specified as having priority, the acquaintance list or the other list is provided to users who poll for "the nearest neighbors." When the names (and/or extensions, desk numbers, telephone numbers, etc.) of the nearest neighbors are returned, the acquaintance list floats to the top of any names of neighbors provided and may be designated under a category titled "John's preferred acquaintance". The users who are given permission to access this "acquaintance list" can be modified by an individual (i.e., John), or the default could be set to the all users who are part of the same organization as the individual.

Also, in exemplary embodiments, a taxonomy may be associated with the acquaintance list, where the taxonomy is user defined. As a non-limiting example, the taxonomy may read, "For family emergencies please contact Joe." For family emergencies, a group of names (and related contact information) may be provided. As non-limiting examples, the taxonomy may read, "For work emergencies please contact Mary, Ann, and Michael."

In accordance with exemplary embodiments, this collective knowledge (which includes the various location techniques, systems, and collection of information) can be used to locate an individual (e.g., John) in case of an emergency, resolving a critical issue, meeting participation, or any need for communication by, e.g., right clicking on the individual on the client application 105 or via phone application. This knowledge base can be used for communicating with the individual when the individual is missing, if the individual is not available temporarily (i.e., do not disturb), or in case of a family emergency.

Figure 2:
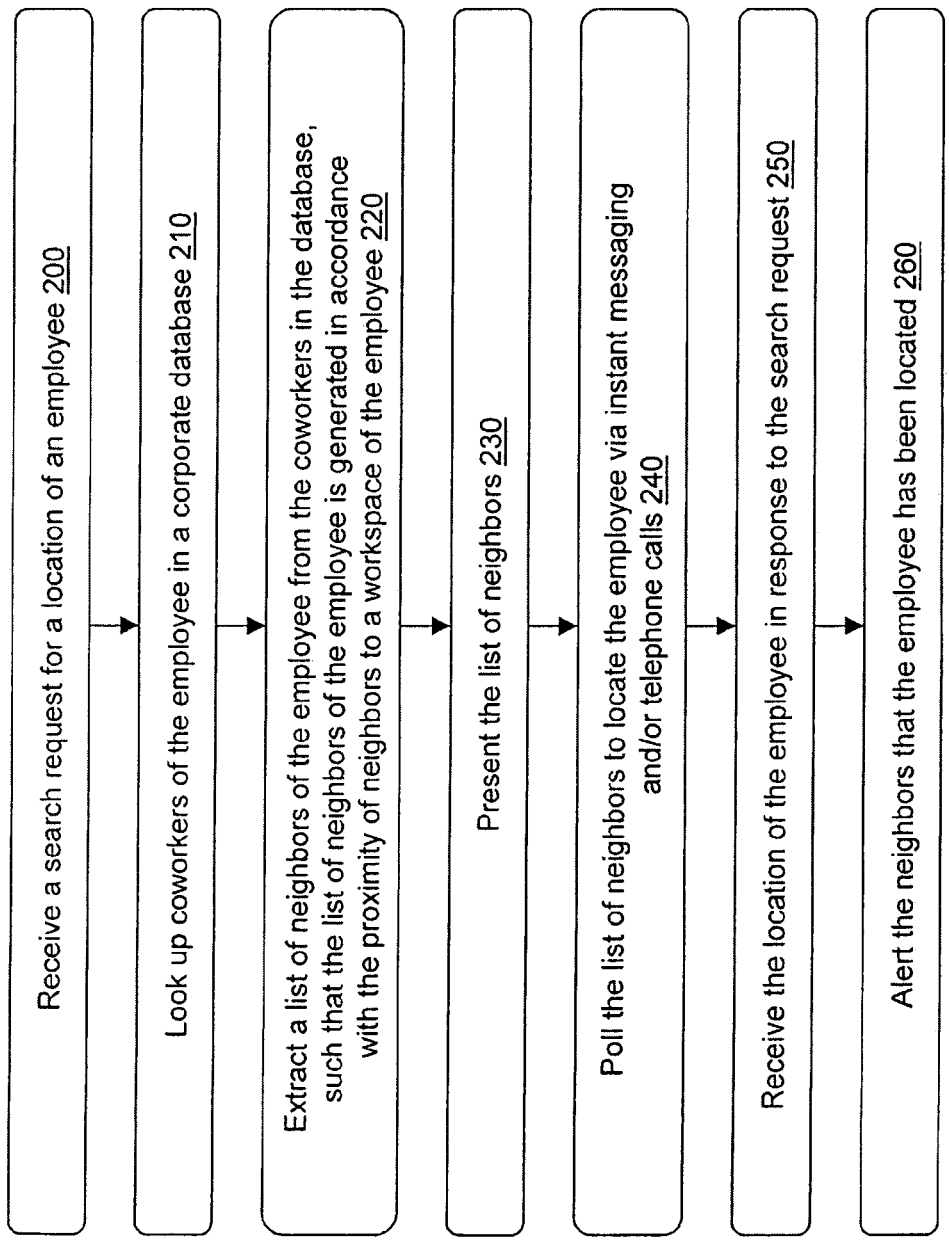
FIG. 2 illustrates a method for exploiting location proximity to derive a desired response in accordance with exemplary embodiments.

FIG. 2 illustrates a method for exploitation of location proximity to derive a location of an employee (e.g., John) in a corporation utilizing instant messaging or automatic telephone calls in accordance with exemplary embodiments.

A search request for a location of an employee is received by the client application 105 at 200. As a non-limiting example, the search request may be input to find John because John is late for a meeting, and John cannot be reached at his communication device 110a nor his telephone 145a. The server application 140 may perform a look up of a plurality of coworkers of the employee (John) in a corporate database (such as the storage device 135) at 210.

In exemplary embodiments, a list of neighbors of the employee John is extracted by the server application 140 from the plurality of coworkers in the corporate database, and the list of neighbors of the employee is generated (e.g., by the client application 105 or the server application 140) in accordance with the proximity of neighbors (in the list of neighbors) to a workspace of the employee John at 220. In exemplary embodiments, the server application 140 (or the client application 105) may search corporate files stored on the server 130 and/or the storage device 135 to locate coworkers who are within a certain proximity to the employee. During the search request, a parameter in the client application 105 may be set so that coworkers who are, e.g., within N desks away may be included in the list of neighbors. Also, a parameter in the client application 105 may be set so that coworkers who are on the same or nearby hall, in the same or nearby cubicle, and/or on the same or nearby wing and floor may be included in the list of neighbors. Additionally, a parameter in the client application 105 may be set to include coworkers are in the same work group (e.g., research and development of new product lines) as the employee.

The client application 105 presents the list of neighbors on the communication device 110, in response to the search request by the person at 230.

The list of neighbors is polled via instant messaging and automatic telephone calls to locate the employee at 240. The person who made the search request may select the neighbors of the list on the client application 105 to poll, or the client application 105 may automatically poll everyone in the generated list of neighbors on behalf of the person making the search request. As a non-limiting example, the person who requested the search may chose to remove some of the coworkers from the list of neighbors, because the person may know. e.g., that those coworkers are absent. In exemplary embodiments, the client application 105 may automatically send messages to the entire list of neighbors without the person removing any coworkers.

In exemplary embodiments, polling the list of neighbors may be accomplished via instant messaging and/or automatic telephone calls. The person who made the search request may input a message (text and/or voice) in the client application 105 of the communication device 110 requesting the location of the employee, and the message is transmitted to each neighbor in the list of neighbors. As a non-limiting example, the person who made the search request using the communication device 110 may input a text message "Please find John and contact me" in the client application 105, and the client application 105 may transmit the message via instant messaging to the people of the list of neighbors (e.g., the message may be sent to the communication devices 110*b*, 110*c*, 110*d*). In exemplary embodiments, the person who made the search request can use the communication device 110 and/or the telephone 145 to input/record a voice message. As a non-limiting example, the voice message "Please find John and contact me" may be input/recorded using a microphone (not shown) in the client application 105. Also, the voice message may be recorded using the telephone 145 and the voice message can be received by the client application 105 and transmitted to the telephones 145*b*, 145*c*, 145*d* of the neighbors. The client application 105 (or another application) may include capabilities for voice over Internet protocol (VoIP), the client application 105 may include capabilities for telephony or be connected to equipment with capabilities for telephony, and the client application 105 may transmit the recorded voice message to the list of neighbors. As a non-limiting example, the voice message may be transmitted to the communication devices 110*b*, 110*c*, 110*d* or to the telephones 140*b*, 140*c*, 140*d*, so that the list of neighbors can assist in locating the employee.

In response to polling the list of neighbors, the location of the employee can be received by the person requesting the search at 250. As a non-limiting example, one of the neighbors (e.g., Cay on the communication device 110*c* or on the telephone 140*c*) may respond back with an instant message (or voice message) "I have found John." The instant message or voice message may be respectively received on the communication device 110 or the telephone 104 by the person who made the search request. The neighbors may be alerted that the employee (John) has been located and there is no need to continue their search at 260. As a non-limiting example, the neighbor who located John may transmit a global instant message, "I have found John," to the other neighbors on the list. As another example, the person who made the search request may transmit an instant message on the communication device 110 indicating that John has been located, and the neighbors can cease searching for John.

In exemplary embodiments, the corporate database may include a lightweight directory access protocol (LDAP) database that comprises an organization of the coworkers. In the corporate database (e.g., the storage device 135), the LDAP database also includes the relative proximity of the coworkers (including John) to each other. This proximity may be in terms of desk numbers, office numbers, cubicle numbers, bay numbers, wings of floor, halls on a floor, organization groups (such as the research and development group for new products), floors of a building, etc.

Also, in exemplary embodiments, the corporate database may include an acquaintance list database that is defined by the employee. The acquaintance list database certain coworkers selected by the employee (John). As a non-limiting example, the coworkers on the acquaintance list may be coworkers that John regularly works with (e.g., on projects), coworkers that John goes to lunch with, coworkers that John frequently associates with, and the like. John may enter the names (and contact data) for these coworkers in the client application 105 residing the on communication device 110*a*. The various names input by John in the client application 105 can be included in the acquaintance list database and stored, e.g., on the sever 130 and/or storage device 135.

In exemplary embodiments, the acquaintance list database may also include non-coworkers input by the employee (John). John may include the contact data of various people who may not be coworkers but the people may be able to provide the location of John and/or contact John. As non-limiting examples, in the acquaintance list database, John may include the contact data for his wife, best friend, mother, sister, or others, and they may be contacted in case of an emergency.

The various processes and methods of the exemplary embodiments may be automated. As a non-limiting example, the person making the search request may select a search for employee field in the client application 110 on the communication device 110 and input John's name in the search for employee field. The client application 105 being in communication with the server application 130 can look up neighbors (e.g., coworkers within proximity of John's workspace) in the corporate database that may be stored on the server 130 and/or the storage device 135. The server application 140 may extract and/or generate the list of neighbors in accordance with the proximity of the coworkers to the workspace of John. The client application 105 may present the list of neighbors on to the person making the request. The client application 105 polls the list of neighbors by asking the neighbors to locate John. The client application 105 may use instant messaging to poll (ask) the neighbors about the location of John. For example, the client application 105 may send a standard text message "Please find John and contact me" to each of the neighbors on their respective communications devices 110*b*, 110*c*, 110*d*. The client application 105 present any response received from the neighbors to the person on the communication device 110. If desired, after initially making the search request, the person can wait to receive responses. Also, the person may deselect some names from the list of neighbors, e.g., if he or she knows that one of the neighbors is not at his desk.

In accordance with exemplary embodiments, it is understood that responsibilities may be shared between the client application 105 and the server application 140. Also, it is contemplated that some responsibilities designated herein to the client application 105 or the server application 140 may be performed by the other. Furthermore, exemplary embodiments are capable of being implemented in a client-server architecture (environment), and exemplary embodiments comprise the necessary hardware and software components to operate in a client-server architecture (environment) as understood by one skilled in the art. Indeed, the various descriptions provided herein are for explanatory purposes and are not meant to be limiting in any manner. Furthermore, exemplary embodiments detailed herein may be implemented on, e.g., a Lotus Sametime® platform.

Figure 3:
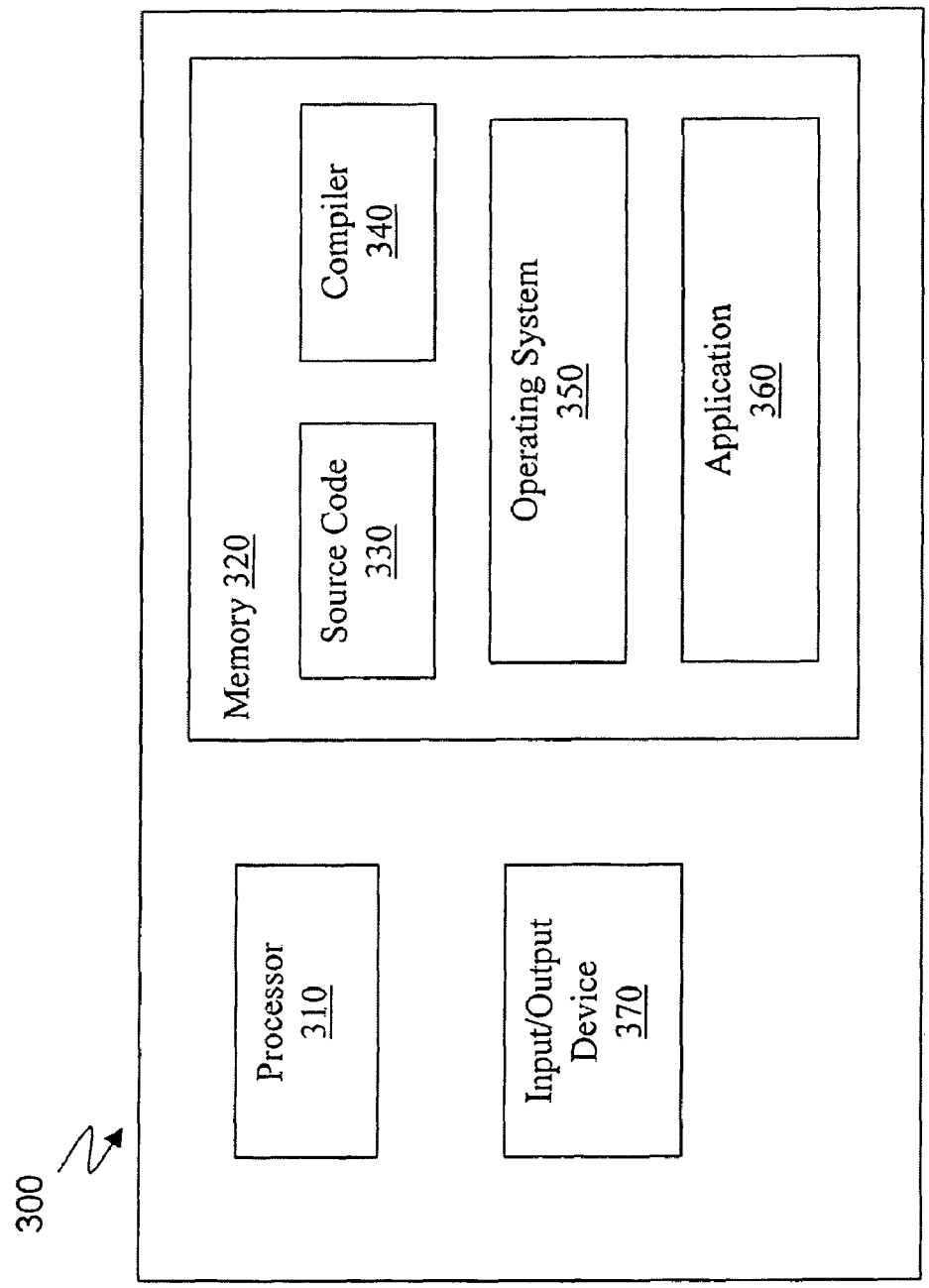
FIG. 3 illustrates an example of a computer in which exemplary embodiments may be incorporated.

FIG. 3 illustrates an example of a computer 300 having capabilities, which may be included in exemplary embodiments. Various methods and processes discussed above may utilize the capabilities of the computer 300. One or more of the capabilities of the computer 300 may be incorporated in the communication devices 110, 110*b*, 110*c*, 110*d*, the network 120, the server 130, and/or any element discussed herein.

The computer 300 includes, but is not limited to, PCs, workstations, laptops, PDAs, palm devices, servers, and the like. Generally, in terms of hardware architecture, the computer 300 may include one or more processors 310, memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/ or data connections to enable appropriate communications among the aforementioned components.

The processor 310 is a hardware device for executing software that can be stored in the memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Spare microprocessor from Sun Microsystems, Inc, a PA-RISC series microprocessor from Hewlett-Packard Company, U.S.A., or a 68xxx series microprocessor from Motorola Corporation, U.S.A.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and an application 360 (which may be one or more applications) in accordance with exemplary embodiments. As illustrated, the application 360 comprises numerous functional components for implementing the features and operations of the exemplary embodiments. The application 360 of the computer 300 may represent the various applications referred to herein, but the application 360 is not meant to be a limitation.

A non-exhaustive list of examples of suitable commercially available operating systems 350 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a Linux operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 350 essentially controls the execution of other computer programs, and provides scheduling, input-output control, file and data management, memory management, and communication control and related services. It is contemplated by the inventors that the application 360 for implementing exemplary embodiments is applicable on all other commercially available operating systems.

The application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to, a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such at the Internet, a WiFi network, a PAN, the PSTN, the network 120, and the like.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 300 includes non-limiting examples of software and hardware components that may be included in various devices and systems discussed herein, and it is understood that additional software and hardware components may be included in the various devices and systems discussed in exemplary embodiments.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for exploitation of location proximity to derive a location of an employee in a corporation utilizing instant messaging or automatic telephone calls, comprising:
   receiving a search request for a location of an employee;
   looking up a plurality of coworkers of the employee in a corporate database;
   extracting a list of neighbors of the employee from the plurality of coworkers, wherein the list of neighbors of the employee is generated in accordance with the proximity of the neighbors in the list of neighbors to a workspace of the employee;
   presenting the list of neighbors, in response to the search request;
   polling the list of neighbors to locate the employee via at least one of instant messaging and automatic telephone calls;
   receiving the location of the employee, in response to polling the list of neighbors; and
   alerting the neighbors after a successful search.

2. The method of claim 1, wherein the corporate database comprises at least one of:
   a light weight directory access protocol (LDAP) database that comprises an organization of the plurality of coworkers with relative proximity to each other; and
   an acquaintance list database that is defined by the employee, the acquaintance list database comprises selected ones of the plurality of coworkers input by the employee.

3. The method of claim 1, wherein the polling of the list of neighbors via the at least one of instant messaging and automatic telephone calls comprises at least one of:
   receiving input of a message requesting the location of the employee, wherein the message is transmitted to each neighbor in the list of neighbors; and
   receiving input of a voice message requesting the location of the employee, wherein the voice message is transmitted to each neighbor in the list of neighbors.

* * * * *